(12) United States Patent  (10) Patent No.: US 8,337,652 B2
Laker et al.  (45) Date of Patent: *Dec. 25, 2012

(54) EFFICIENT LAMINATION PRESS WITH FLEXIBLE PLATENS

(75) Inventors: Matthew B. Laker, West Valley City, UT (US); Raymond L. Goodson, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/054,461

(22) PCT Filed: Jul. 22, 2009

(86) PCT No.: PCT/US2009/051425
§ 371 (c)(1),
(2), (4) Date: Jan. 14, 2011

(87) PCT Pub. No.: WO2010/011764
PCT Pub. Date: Jan. 28, 2010

(65) Prior Publication Data
US 2011/0120640 A1  May 26, 2011

Related U.S. Application Data

(60) Provisional application No. 61/082,767, filed on Jul. 22, 2008.

(51) Int. Cl.
*B32B 37/00* (2006.01)
(52) U.S. Cl. ........ 156/228; 156/498; 156/499; 156/581; 156/583.3

(58) Field of Classification Search .................. 156/228, 156/311, 498, 499, 580, 581, 583.1, 583.3
See application file for complete search history.

(56) References Cited

U.S. PATENT DOCUMENTS

| 1,549,619 | A | | 8/1925 | Steenstrup |
| 2,371,847 | A | * | 3/1945 | Saunders et al. ............. 156/291 |
| 3,029,178 | A | | 4/1962 | Carver |
| 3,376,808 | A | | 4/1968 | Beckett |
| 3,950,210 | A | | 4/1976 | Gibbs |

(Continued)

FOREIGN PATENT DOCUMENTS
EP  1293271  3/2003
(Continued)

OTHER PUBLICATIONS

International Search Report and Written Opinion on PCT/US09/51396, mailed Sep. 16, 2009.

(Continued)

*Primary Examiner* — James Sells
(74) *Attorney, Agent, or Firm* — Workman Nydegger

(57) ABSTRACT

An efficient lamination presses can rapidly provide both heating and cooling, as well as pressure to resin sheets to create a laminate end-product. Specifically, an efficient lamination press can comprise one or more components and apparatus that can apply uniform fluid pressure across one or more platens. The one or more platens, in turn, can flex about one or more contours in a layup assembly. For example, an exemplary platen can comprise a plurality of coupled platen extensions, which can flex or otherwise adjust about each other to help create flexibility in the platen, and thus, uniform pressure across a laminate assembly.

21 Claims, 8 Drawing Sheets

U.S. PATENT DOCUMENTS

| | | | |
|---|---|---|---|
| 4,217,157 | A | 8/1980 | Stoltze |
| 4,311,549 | A | 1/1982 | Vercillo |
| 4,421,589 | A | 12/1983 | Armini |
| 4,715,923 | A | 12/1987 | Knoll |
| 4,923,560 | A | 5/1990 | Inselmann |
| 5,112,431 | A | 5/1992 | Gerhardt |
| 5,562,028 | A * | 10/1996 | Bielfeldt et al. ............... 100/311 |
| 5,589,026 | A | 12/1996 | Pereeman |
| 5,611,269 | A * | 3/1997 | Bielfeldt ....................... 100/311 |
| 5,628,845 | A | 5/1997 | Murray |
| 5,635,014 | A | 6/1997 | Taylor |
| 6,030,474 | A | 2/2000 | Isono |
| 2005/0056363 | A1 | 3/2005 | Takeyama |

FOREIGN PATENT DOCUMENTS

EP        1803547        4/2007

OTHER PUBLICATIONS

International Search Report and Written Opinion on PCT/US09/51425, mailed Oct. 15, 2009.

EPO Search Report and Opinion on Application No. EP 09800937.6 (Mailed Dec. 23, 2011).

EPO Search Report and Opinion on Application No. EP 09800952.5 (Mailed Dec. 23, 2011).

* cited by examiner

EFFICIENT LAMINATION PRESS WITH FLEXIBLE PLATENS

CROSS-REFERENCE TO RELATED APPLICATIONS

This application is a U.S. National Stage Application of PCT Application No. PCT/US09/51425, filed on Jul. 22, 2009, entitled "Efficient Lamination Press With Flexible Platens," which claims the benefit of priority to U.S. Provisional Application 61/082,767, filed Jul. 22, 2008, entitled "Lamination Press." The entire content of each of the aforementioned patent applications is incorporated by reference herein.

BACKGROUND OF THE INVENTION

1. The Field of the Invention

The present invention relates generally to lamination presses for forming resin products.

2. Background and Relevant Art

Laminated resin panels have a wide utility in design and architectural applications, including use as walls, partitions, lighting fixtures, displays, etc. Laminated resin materials are popular because they tend to be less expensive than materials such as glass or the like, in many applications where certain structural, optical, and aesthetic characteristics are desired. In addition, laminated resin materials tend to be more flexible in terms of manufacture and assembly, since resin materials are relatively easy to bend, mold, color, shape, cut, and modify in many different ways. One particularly popular technique is to embed decorative layers, such as, for example, fabrics, paper, colored films, printed images, or three-dimensional objects (grass, reed, rocks, flowers, metal, etc.) between translucent resin sheets. These and other resin panels are often produced using heated lamination, which involves the application of pressure and heat to at least partially melt the resin sheets to each other to form a final resin panel product.

Conventional lamination technology, however, can lead to panel damage or imperfections, and can introduce significant overhead and inefficiency into the resin panel production process, as explained in greater detail below. In many conventional lamination processes, a component press applies heat and pressure to a stack of sheets of material (often called a layup stack or laminate assembly, sandwich, or a book) to join the sheets together. A second component press then cools the sheets under pressure to form a resulting unitary product. In many lamination operations, it is necessary to control the pressing, heating, and cooling of the laminate assembly to ensure proper fusing and the minimization of flaws and stresses in the resulting product.

To press a laminate assembly together, conventional lamination presses typically use large, heavy cast iron platens. In particular, pistons, hydraulic cylinders, or apparatus act on finite contact points on platens to actuate and press the platens together. Pressure applied to finite contact points can bend, warp, or otherwise deform the platens over time. These imperfections can produce inconsistent pressure along the surface(s) of the laminate assembly, which often results in finished products having an inconsistent gauge, waves, or other deformities. Additionally, normal use can scratch, dent, or otherwise damage the surface of the platens, which can lead to similar corresponding surface damage in products formed by such platens.

One potential solution for damaged platens is to simply replace them. Unfortunately, the material, size, and construction of conventional platens make replacement extremely expensive and otherwise impracticable. Thus, manufacturers typically use tooling plates and/or pressure pads between the laminate assembly and the platens to compensate for any deformities in the platens. The tooling plates and pressure pads can help provide smooth surfaces and produce more uniform distribution of pressure across a laminate assembly. The use of tooling plates and pressure pads, however, also decreases the efficiency of the lamination processes and increases processing times. In particular, manufacturers must spend time and effort to position any tooling plates and pressures pads. Furthermore, the additional layers between the platens and laminate assembly reduce the heat transfer rate to the laminate assembly, and thus, require additional heat, time, and cost.

In addition to the foregoing, conventional pressing processes can create various drawbacks specific to the materials being processed. For example, when embedding three-dimensional objects within resin sheets, traditional pressing processes can smash or otherwise damage the three-dimensional objects. In particular, traditional presses can concentrate a disproportionate amount of pressure on a few of the three-dimensional objects as the resin sheets begin to melt, thereby producing a flawed final product. To avoid this, manufacturers often apply increasing amounts of heat and/or pressure in steps to help ensure the resin sheets melt and form around the three-dimensional objects instead of crushing them. Such stepped processes, however, can significantly increase processing times and overall process overhead.

In addition to the various drawbacks of conventional pressing processes, the heating processes of conventional lamination presses can also present various drawbacks and inefficiencies. Conventional presses typically heat the platens using either a plurality of electrical heating elements embedded within the platens, or by passing hot oil or steam through serpentine fluid channels formed in the platens. Each of these heating methods, however, can in some instances lead to hot spots and uneven heating.

Conventional platens are usually made of cast iron for its heat retention capabilities and for its manufacturability, which allows for the creation of the serpentine fluid channels and/or embedding of the heaters. The cast iron construction of the platens, however, tends to make precise temperature control difficult, requiring significant time and energy to heat or cool the platens to a desired temperature. For this reason, manufacturers often use a "hot" component press and a separate "cold" component press. The use of two component presses allows the manufacturer to maintain both presses at a desired temperature, and avoid the time and energy required to change the platen temperature.

The time and effort needed to transfer the laminate assembly from the hot component press to the cold component press, however, increases production time, creates the potential for damaging the materials, and otherwise adds inefficiency to the lamination process. Furthermore, in such cases the manufacturer will often maintain the heat of the hot component press for extended periods of time, even between jobs. Heating or maintaining the temperature of the hot component press between jobs, by itself, can lead to significant costs.

Even when using separate hot and cold presses, a manufacturer will often still need to adjust the temperature of a given hot or cold component press depending on the type and gauge of the material being processed. For example, if the manufacturer needs to process both ¼ inch and ½ inch gauge panels, the manufacturer may first adjust the temperature of the press for one gauge, such as the ¼ inch panels. After processing the ¼ inch panel, the manufacturer may then adjust the temperature for the ½ inch gauge panels. As mentioned previously, when using conventional lamination presses, such temperature adjustments tend to be difficult to determine and maintain with precision. Thus, if a site regularly processes a variety of different panel gauges or materials, the time and energy associated with these temperature adjustments can lead to significant manufacturing inefficiency.

Additionally, the cooling processes of conventional lamination processes can add even further inefficiencies and drawbacks to the lamination process. For example, conventional platens are often cooled by running cold liquids or air through the serpentine fluid channels formed in the platens. Uniform cooling of conventional platens can be problematic; however, because the introduction of low temperature cooling fluids into the fluid channels of the platens often cools the platen much faster at the inlet than the outlet. This can prevent the portion of the laminate assembly from properly cooling, require longer cooling time, or otherwise add inefficiencies to the lamination process.

Thus, conventional presses typically require significant front-end work, including a great deal of energy and labor. For example, typical cycles (combined pressing, heating, and cooling) for a given decorative resin panel using conventional lamination presses are in best case scenarios about thirty minutes or more. Such processing times do not include any time required to change the temperature of a press based on the material or gauge of the panel being processed. In addition, such operation cycles often require at least six to eight people.

BRIEF SUMMARY OF THE INVENTION

Implementations of the present invention comprise systems, methods, and apparatus for applying heat and pressure to laminate assembly with increased processing efficiency, while still producing final products with excellent structural and aesthetic properties. In particular, implementations of the present invention comprise apparatus that can decrease lamination process times by providing rapid heating and cooling of a single press. Additionally, implementations of the present invention comprise apparatus that can do the same while requiring less energy and labor than conventional lamination processes.

For example, one implementation of a lamination press configured to apply heat and uniform pressure to laminate assembly to rapidly and efficiently form a laminated product can include an upper press component and a lower press component. Where each press component includes a corresponding first or second flexible platen moveably coupled thereto. The lamination press can also include one or more fluid actuators configured to pressurize one or more of the press components with fluid and apply uniform fluid pressure to one or more of the first and second flexible platens. Also, one or more of the first flexible platen and the second flexible platen can be configured to move toward the other and apply substantially uniform pressure to a laminate assembly as the upper press component and the lower press component are pressurized. Also, one or more of the first and second flexible platens can be configured to move toward the other of the first and second flexible platens and apply substantially uniform pressure to a laminate assembly as one or more of the upper press component and the lower press component are pressurized. Additionally, the lamination press can include one or more heat sources configured to heat the first flexible platen and the second flexible platen.

Furthermore, an implementation of a flexible platen for use in a lamination press for applying uniform pressure to a laminate assembly to form a unitary product can include a plurality of platen extensions. Each platen extension of the plurality of platen extensions can include a first surface, an opposed second surface, and a thickness extending therebetween. The plurality of platen extension can be coupled together so that the first surfaces of the plurality of platen extensions comprise a substantially planar surface configured to apply uniform pressure to a surface of a laminate assembly.

In addition to the foregoing, an implementation of a method for applying heat and pressure to a laminate assembly to form a unitary product can involve placing two or more layers between opposing platens of a lamination press. The method can also involve pressing the laminate assembly together by applying substantially uniform fluid pressure across at least a majority of the opposing platens to close a distance between the opposing platens. The method can additionally involve heating the laminate assembly by heating the opposing platens. Also, the method can involve cooling the laminate assembly by cooling the opposing platens of the laminate assembly.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
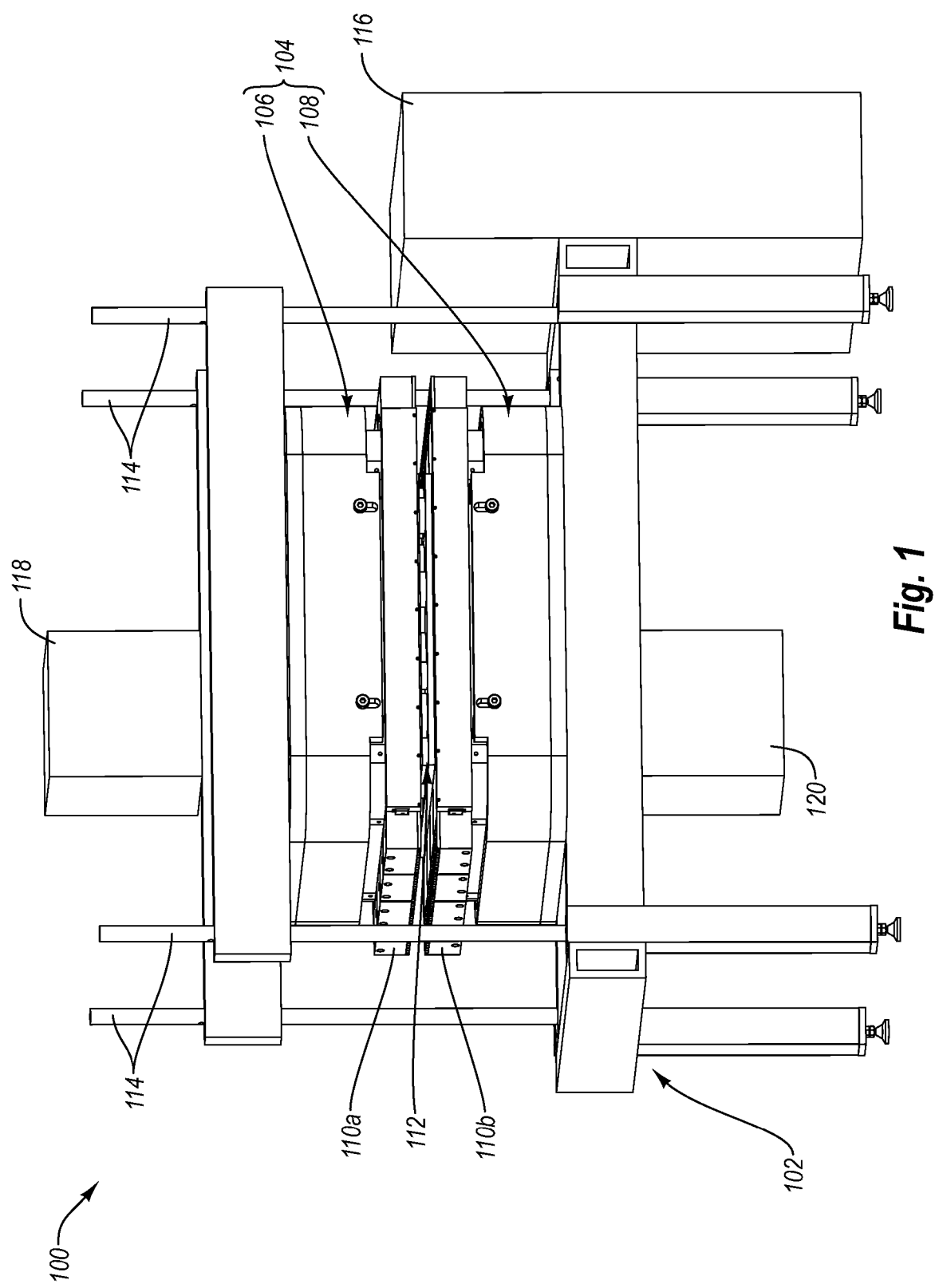
FIG. 1 illustrates a perspective view of a lamination press in accordance with an implementation of the present invention.

The present invention relates to systems, methods, and apparatus for applying heat and pressure to laminate assembly with increased processing efficiency, while still producing final products with excellent structural and aesthetic properties. In particular, implementations of the present invention comprise apparatus that can decrease lamination process times by providing rapid heating and cooling of a single press. Additionally, implementations of the present invention comprise apparatus that can do the same while requiring less energy and labor than conventional lamination processes.

More specifically, one or more implementations of the present invention include a lamination press that applies substantially uniform pressure across one or more opposing platens, and thereby, eliminates or reduces platen deformation and associated product flaws. One will appreciate that, by applying uniform or substantially uniform pressure across at least a majority of the platens, such lamination presses can also reduce or eliminate the need for pressure pads and tooling plates. By eliminating or reducing the need for pressure pads, one or more implementations of the present invention can increase heat transfer efficiency, reduce the power requirements, and reduce the processing times.

Additionally, at least one implementation of a lamination press can include flexible platens. Platens with the ability to flex or pivot can reduce platen wear, and help ensure a uniform or substantially uniform distribution of pressure across the surfaces of a laminate assembly, which may not itself be uniform. Thus, the flexible platens can also allow for the elimination of pressure pads and tooling plates, and thereby increase lamination speed and efficiency. Also, according to one or more implementations, the flexible platens can adjust or compensate for the processing of non-planar materials. For example, the ability to flex or pivot can help allow the platens to apply uniform or substantially uniform pressure across lamination materials that have surface variances, or are otherwise non-planar. This can lead to a similarly even distribution of pressure on materials between opposing resin sheets in a layup assembly.

Furthermore, one or more implementations of the present invention can include modular platens comprising a plurality of coupled platen extensions. In addition to the benefits of flexibility described herein, the plurality of platen extensions can allow replacement of damaged sections of the platen without requiring replacement of the entire platen. The modular construction of the platens can also allow for relatively easy resizing, reconfiguring, and moving of a lamination press.

As an initial matter, the implementations are described herein below primarily with reference to processing of decorative resin panels. One will appreciate, however, that panels, particularly resin-based panels, are only one type of product that the apparatus, systems, and methods of the present invention can produce. For example, one or more implementations can process not only resin "panels," as such, but also glass panels. Furthermore, one will appreciate that at least one implementation can also process other types of structures having different material compositions, such as objects comprising wood, stone, fiberglass, or the like, which may or may not exhibit primarily panel-like dimensions as described herein. Such structures can include, for example, circuit boards, films, fabrics, etc. Reference herein, therefore, to panels, or even resin panels, as such, is primarily for convenience in description.

Accordingly, and as will be understood more fully from the following specification and claims, at least one implementation includes a lamination press having a press assembly configured for pressing, heating, and cooling layers of resin material. For example, FIG. 1 illustrates a perspective view a lamination press 100 according to an implementation of the present invention. As shown in FIG. 1, the lamination press 100 can include a frame 102 for supporting or mounting one or more press assemblies 104. For instance, FIG. 1 shows that the lamination press 100 can include at least one press assembly 104 having an upper press component 106 and a lower press component 108. The upper and lower press components 106, 108, in turn, can respectively comprise an upper platen assembly 110a and a lower platen assembly 110b.

Figure 2A:
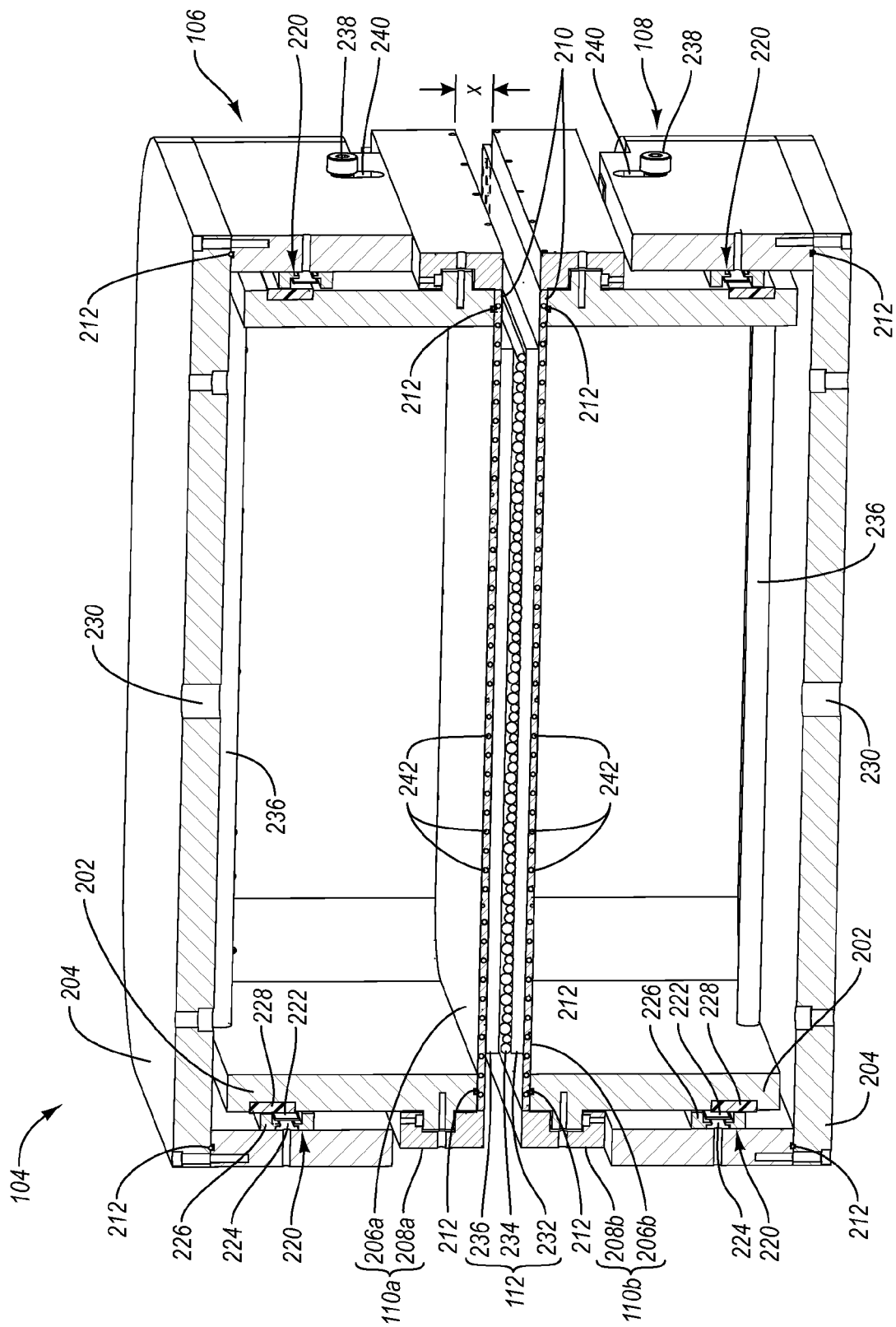
FIG. 2A illustrates a side perspective, cross-sectional view of a press assembly of the lamination press of FIG. 1 in a retracted configuration in accordance with an implementation of the present invention.

As described in more detail herein, the lamination press 100 can apply heat and pressure to a laminate assembly 112 to form a unitary product. As used herein, the term "laminate assembly" (or "layup stack") refers to two or more layers of material that a lamination press can at least partially form together through the application of heat and pressure. For example, FIG. 2A illustrates a laminate assembly 112 that includes a first resin sheet, a decorative image layer, and a second resin sheet. In other cases, the laminate assembly 112 may also or alternatively comprise a substrate (e.g., a resin or glass sheet), and an adjacent decorative image layer. Still further a laminate assembly 112 can include a pair of substrates (e.g., a plurality of resin and/or glass sheets) with no additional image layer, or perhaps only a film layer.

In any case, the upper and lower press components 106, 108 can apply pressure to a laminate assembly 112 by pressing the upper and lower platen assemblies 110a, 110b together, about the laminate assembly 112. While the upper and lower platen assemblies 110a, 110b are pressing the laminate assembly 112 together, a heating source can heat the upper and lower platen assemblies 110a, 110b, and thus the laminate assembly 112. The heat and pressure supplied by the upper and lower platen assemblies 110a, 110b can cause the layers of the laminate assembly 112 to at least partially form together. Additionally, a cooling source can then cool the upper and lower platen assemblies 110a, 110b, and thus the laminate assembly 112, to form a unitary product.

As FIG. 1 illustrates, in one or more implementations of the present invention, the upper and lower press components 106, 108 are identical, and are mounted to the frame 102 in mirrored positions relative to one another. Furthermore, a manufacturer can selectively move the upper press component 106 and/or the lower press component 108 relative to the frame 102 to open the press assembly 104. In other words, the lamination press 100 can allow a manufacturer to increase the space between the upper and lower press components 106, 108 to allow placement, positioning, and removal of a laminate assembly 112.

For example, according to one or more implementation, the frame 102 can include a scissor lift (not shown), which a manufacturer can manipulate to raise or lower one or more of the press components 106, 108 relative to each other. Additionally, FIG. 1 shows that the frame 102 can alternatively include a plurality of supports 114 along which a manufacturer can slide and selectively lock the upper press component 106 and/or the lower press component 108 to open and close the press assembly 104. In alternative or additional implementations, the frame 102 can include a hinge assembly about which a manufacturer can pivot the upper press component 106 to open the press assembly 104.

FIG. 1 illustrates a lamination press 100 having a single press assembly 104. Thus, the lamination press 100 depicted in FIG. 1 has the capability to process a single laminate assembly 112 (or a single group of combined laminate assemblies 112) at a time. The present invention, however, is not so limited. For example, according to one or more implementations, the lamination press 100 can include a plurality of press assemblies 104 that permits the lamination press 100 to process a plurality of laminate assemblies 112 (or a plurality of groups of laminate assemblies 112) concurrently.

In particular, the lamination press 100 can include a plurality of vertically or horizontally stacked or aligned press assemblies 104. One will appreciate that, in such implementations, a manufacturer can stagger the processing cycles of each press assembly 104 to increase processing efficiency and reduce labor. For instance, when the lamination press 100 includes two press assemblies 104, the manufacturer can assemble and position a laminate assembly 112 in a first press assembly 104, while a second press assembly 104 is pressing, heating, and cooling another laminate assembly 112. Once the second press assembly 104 is done forming a unitary product, the manufacturer can assemble and position another laminate assembly 112 therein, while the first press assembly 104 is processing its laminate assembly.

Additionally, as explained in greater detail below, in at least one implementation, the lamination press 100 can include a fluid actuator 116 for actuating the upper and lower press assemblies 110*a*, 110*b*. In addition, the lamination press 100 can include one or more heating and cooling sources for heating and cooling the upper and lower press assemblies 110*a*, 110*b*. For example, FIG. 1 illustrates that lamination press 100 can include a cooling source 118 that pumps a cooling medium through the upper and lower platen assemblies 110*a*, 110*b* to cool the platens. In such an implementation, the lamination press 100 can include a plurality of tubes or piping (not shown) connecting the cooling source 118 to the upper and lower platen assemblies 110*a*, *b*. In one or more implementations, the lamination press 100 can also include a heating source 120 that pumps a heating medium through tubes or piping (not shown) to the upper and lower platen assemblies 110*a*, 110*b* to heat the platens. Alternatively, as explained in greater detail below, the heating source can include an embedded electric heaters or a radiant heating source.

As previously mentioned, the lamination press 100 can apply uniform or substantially uniform fluid pressure across a surface of the platens, and thereby increase processing efficiency by reducing or eliminating platen deformation and the need for pressure pads and plates. For example, according to at least one implementation, each of the upper press component 106 and the lower press component 108 can comprise fluid tight pressure boxes or enclosures, which a fluid actuator 116 can pressurize, causing the upper and lower platen assemblies 110*a*, 110*b* to press the laminate assembly 112.

For example, FIG. 2A illustrates a side perspective, cross-sectional view of the press assembly 104 of the lamination press 100 in an un-actuated or unexpanded configuration. As shown by FIG. 2A, the upper press component 106 and the lower press component 108 can each include an inner housing 202 movably coupled to an outer housing 204. FIG. 2A also illustrates that of the upper platen assembly 110*a* can include a first platen 206*a* coupled thereto by a frame assembly 208*a*. Similarly, the lower platen assembly 110*b* can include a second platen 206*b* coupled thereto by a frame assembly 208*b*. Additionally, FIG. 2A shows that the first and second platens 206*a*, 206*b* (or "platens 206") can comprise a plurality of fluid channels 242 for use in cooling and/or heating the platens 206, as explained in greater detail below.

According to one or more implementations of the present invention, the upper and lower press components 106, 108 can each comprise a fluid tight cavity or box. For example, each of the press components 106, 108 can include one or more seals 212 within the interfaces between each of the inner housing 202, the outer housing 204, the upper and lower platen assemblies 110*a*, 110*b*, and their component parts. The seals 212 can prevent fluid from escaping or entering the press components 106, 108. Additionally, because the upper and lower press components 106, 108 are fluid tight, the fluid actuator 116 (FIG. 1) can regulate a quantity of fluid within the upper and lower press components 106, 108, and thereby, the amount of pressure the platens 206 exert on a laminate assembly 112.

Furthermore, each of the press components 106, 108 can remain fluid tight while the inner housing 202 moves relative to the outer housing 204, and the press components 106, 108 expand and contract. For example, FIG. 2A illustrates that one or more implementations can include a sliding seal 220 between the inner housing 202 and the outer housing 204 of each press component 106, 108. The sliding seal 220 can prevent fluid from escaping or entering the press components 106, 108, while also allowing the inner housing 202 to move relative to the outer housing 204. FIG. 2A illustrates that according to at least one implementation, the sliding seal 220 can include a radial seal component 222, a biasing member 204, and a support member 226.

The radial seal component 222 can comprise a resilient material, such as, for example, synthetic or naturally occurring rubbers, polymers, or mixtures and alloys thereof. The radial seal component 222 can also comprise a material capable of withstanding high temperatures. For example, according to one or more implementations, the radial seal component 222 can comprise silicone. Additionally, the radial seal component 222 can include a polymeric coating, such as, for example, a polytetrafluoroethylene coating, to reduce the friction between the radial seal component 222 and the outer wall of the inner housing 202.

In addition to the polymeric coating on the radial seal component 222, the sliding seal 220 can include other components to aid in reducing the friction between the radial seal component 222 and the inner housing 202. The reduced friction between the radial seal component 222 and the inner housing 202 can help prevent wear and degradation of the radial seal component 222, and thus, increase the operating life of the sliding seal 220. According to one or more implementations, the sliding seal 220 can include a section 228 positioned along the outer wall of the inner housing 202 that has a low coefficient of friction to help allow the inner housing 202 to slide along the radial seal component 222. For example, FIG. 2A illustrates that the low-friction section 228 can comprise a pad of material. This material can be both abrasion resistant and have a low coefficient of friction, examples of which include polytetrafluoroethylene.

According to yet additional implementations, the low friction section 228 can include a low friction tape surrounding the inner housing 202 in addition to, or in place of, the pad. Such tapes can include, for example, polytetrafluoroethylene tape or an ultra-high molecular weight polyethylene (UHMW) tape. In any case, one will appreciate that the sliding seal 220 can include one or more mechanisms that enable the inner housing 202 to slide relatively easily along the radial seal component 222, while also minimizing or eliminating any wear or damage to the radial seal component 222.

The biasing member 224 of the sliding seal 220 can bias or press the radial seal component 222 against the inner housing 202, and thus, help ensure a constant and consistent seal between the inner housing 202 and the outer housing 204. For example, FIG. 2A illustrates according to one or more implementations, the biasing member 224 can comprise an inflatable bladder positioned between the inner wall of the outer housing 204 and the radial seal component 222. Furthermore, FIG. 2A illustrates that the biasing member 224 can have a t-shaped configuration. The wider, base portion of the t-shaped biasing member 224 can help prevent the biasing member 224 from rocking or deflecting as the inner housing 202 slides along the seal 220.

As mentioned previously, the sliding seal 220 can further include a support member 226. The support member 226 can help prevent both the radial seal component 222 and the biasing component 224 from rocking or deflecting as the inner housing 202 slides along the sliding seal 220. For example, as shown in FIG. 2A, the support member 226 can at least partially surround and provide lateral support to both the radial seal component 222 and the biasing component 224. The lateral support provided by the support member 226 can prevent the lateral edges of the radial seal component 222 from lifting away from the inner housing 202 and breaking the seal between the inner housing 202 and the outer housing 204 during expansion and contraction of the press components 106, 108.

In order to actuate the upper and lower press components 106, 108, a fluid actuator 116 (FIG. 1) can pump fluid through tubes (not shown) into one or more holes 230 formed in the upper and lower press components 106, 108. According to one or more implementations, the fluid can comprise a gas, vapor, or liquid. For example, the fluid can comprise an inert gas such as air or nitrogen. In such implementations, the fluid actuator 116 can comprise an air compressor or pump. In any event, the fluid actuator 116 can pressurize the upper and lower press components 106, 108 with fluid. The pressurization of the press components 106, 108 can distribute uniform or substantially uniform fluid pressure across at least a majority of the platens 206 of the press assembly 104. One will appreciate in light of the disclosure herein that the uniform or substantially uniform distribution of fluid pressure across the platens 206 can minimize or eliminate warping and other damage common to conventional platens.

Additionally, as explained in greater detail below, the uniform or substantially uniform fluid pressure across the platens 206 can also reduce or eliminate the need for additional mechanisms for aiding in distributing pressure from the platens 206 evenly or uniformly across the outer surfaces of a laminate assembly 112. The elimination of pressure pads, tooling plates, and similar mechanisms can speed up the heating and cooling rates of the press assembly 104, as it eliminates intermediate layers between the platens 206 and the laminate assembly 112. The increased heat transfer rates allow for reductions in processing time, power requirements, and otherwise increase the efficiency of the lamination process.

Figure 2B:
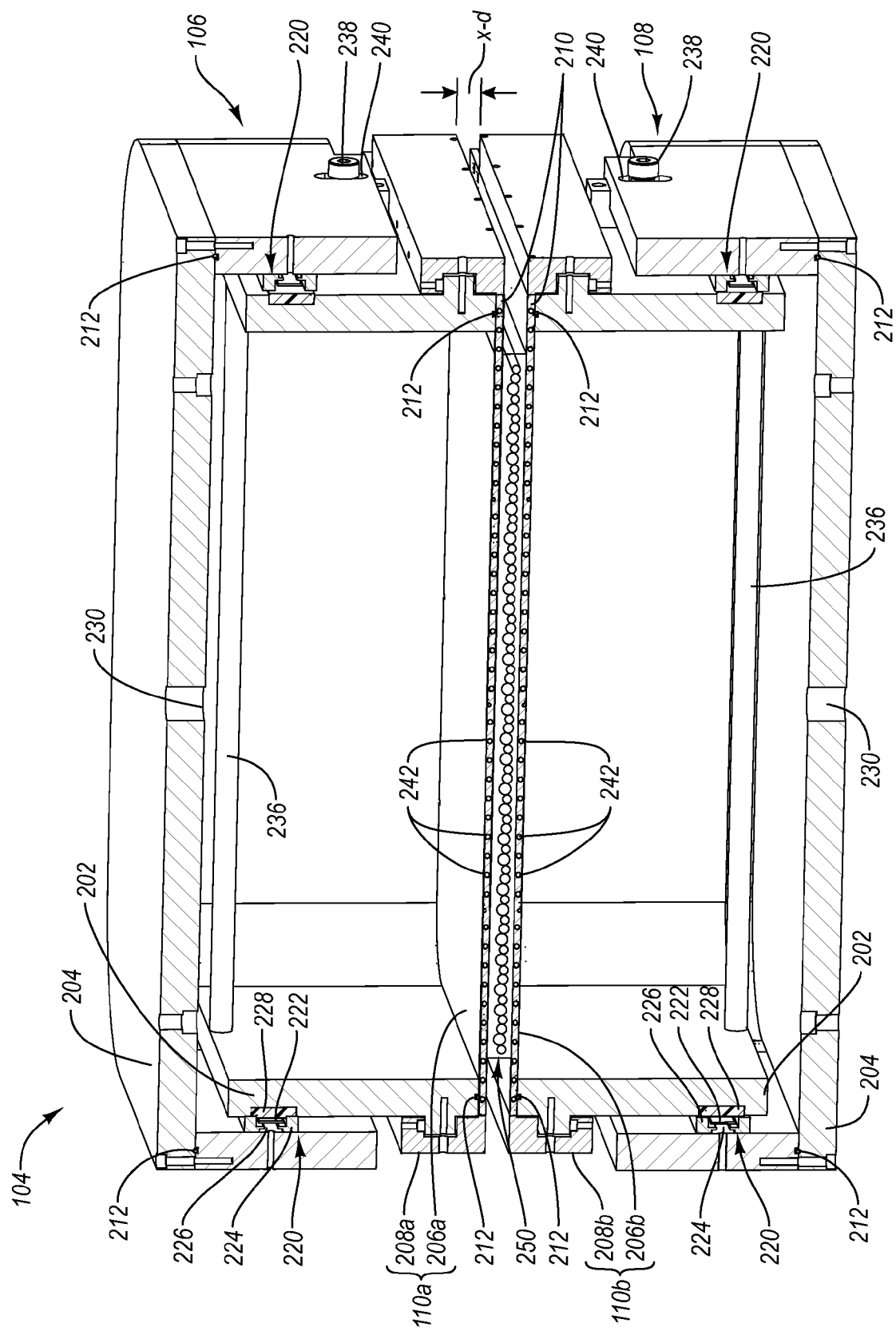
FIG. 2B illustrates a side perspective, cross-sectional view of a press assembly of the lamination press of FIG. 1 in an expanded configuration in accordance with an implementation of the present invention.

According to one or more implementations of the present invention, the fluid pressure within the upper and lower press components 106, 108 may not act across the entire surface area of the platens 206. Indeed, a portion of the inner housing 202 or the frames assemblies 208a, 208b may cover the edges of the platens 206 and prevent fluid pressure from acting thereon. For example, FIGS. 2A-2B illustrates that the inner housing 202 may secure and cover the outer edges 210 of the platens 206.

One will appreciate in light of the disclosure herein that this may create a pressure gradient between the portions of the platens 206 exposed to the fluid pressure and the outer edges 210 that are not. In order to help ensure a uniform or substantially uniform distribution of pressure across the outer surfaces of the laminate assembly 112, the platens 206 may have a size and shape larger than the laminate assembly 112. The larger size of the platens 206 compared to the laminate assembly 112 can allow a manufacturer to position the laminate assembly 112 within the area of the platens 206 uncovered by the inner housing 202 or platen frame 208.

According to one or more implementations, however, the fluid pressure within the upper and lower press components 106, 108 may act across the entire surface area of the platens 206. For example, a manufacturer can configure the upper and lower press components 106, 108 so the edges of the platens 206 couple directly to the inner walls of the inner housing 202. In such implementations, the fluid actuator 116 can subject the entire platens 206 to uniform or substantially uniform fluid pressure.

In any event, the fluid actuator 116 can increase or decrease the pressure within the press components 106, 108 to cause the press components 106, 108 to expand or contract toward each other. For example, FIG. 2A illustrates the upper and lower press components 106, 108 in an un-expanded or un-actuated state where the first platen 206a and the second platen 206b are separated by a distance "x." In contrast, FIG. 2B illustrates the upper and lower press components 106, 108 in an expanded or actuated state where the first platen 206a and the second platen 206b are separated by a distance x-d. One will appreciate that "d" can be the distance the one of more of the first platen 206a and the second platen 206b each move towards each other during a pressing process. As explained in greater detail below, the press assembly 104 can form the unitary product 250 (FIG. 2B) by applying heat and pressure to the laminate assembly 112 (FIG. 2A).

As a preliminary step in forming a unitary product, a manufacturer can place a laminate assembly 112 on the second platen 206b of the lower press component 108. For example, FIG. 2A illustrates that a manufacturer can place a first resin layer 232 on the second platen 206b, a decorative image layer 234 on the first resin layer 232, and a second resin layer 236 over the decorative image layer 234 to form a laminate assembly 112. As mentioned previously, the decorative image layer 234 can comprise fabrics, paper, colored films, printed images, or three-dimensional objects. For example, FIG. 2A shows the decorative image later 234 comprises a layer of thatch reed.

After having positioned laminate assembly 112 on the second platen 206b, the manufacturer can close the press assembly 104 over the laminate assembly 112. For example, as shown in FIG. 2A, the manufacturer can lower the upper press component 106 over the laminate assembly 112 until the first platen 206a is proximate, or abuts against, the upper layer 236 of the laminate assembly 112. The manufacturer can then use the fluid actuator 116 to pressurize the press assembly 104 and press the laminate assembly 112.

For example, the fluid actuator 116 can fill the upper and lower press components 106, 108 with fluid. As the upper and lower press components 106, 108 are filled with fluid, uniform or substantially uniform fluid pressure can act upon at least a majority of the surface area of the platens 206, which in turn can press the laminate assembly 112. As the fluid actuator 116 increases the pressure within the upper and lower press components 106, 108, the platens 206 can move a distance "d" relative to the outer housings 204, increasing the platen pressure on the laminate assembly 112.

One will appreciate that the distance "d" that the upper and lower press components 106, 108 expand can depend upon the materials being processed. For example, in one implementation, the lamination assembly 104 can heat and press a laminate assembly to form a resulting unitary product having substantially the same thickness or gauge as the laminate assembly 112. During such lamination processes, the platens 206 may exert pressure upon the laminate assembly, but may not move a substantial amount closer to each other.

According to another implementation, the lamination assembly 104 can heat and press a laminate assembly to form a unitary product having a smaller gauge than the original laminate assembly. For example, FIGS. 2A and 2B illustrate the press assembly 104 forming a unitary product 250 from a laminate assembly 112 having a thicker gauge than the resulting unitary product 250. Specifically, as the platens 206 press and heat the laminate assembly 112, the first and second resin layers 232, 236 can at least partially melt and flow around the decorative image layer 234, thereby, reducing the gauge of the laminate assembly 112.

In any event, the fluid actuator 116 can regulate the amount of fluid within the upper and lower press components 106, 108 to control the amount of pressure the platens 206 exert on a laminate assembly 112. One will appreciate in light of the disclosure herein that the total amount of force within the upper and lower press components 106, 108 can be relatively large. For example, press components 106, 108 having platens 206 that are four square feet can experience about two and a half tons of force. Press components 106, 108 having larger platens 206 can experience even larger forces. In light of such large forces, the press assembly 104 can include various safety features to provide strength to the press components 106, 108, and help prevent deformation or other damage.

For example, FIGS. 2A and 2B illustrate that the press assembly 104 can include cross stiffeners 236 that provide additional strength to the press components 106, 108. Furthermore, FIGS. 2A and 2B illustrate that the press components 106, 108 can include shoulder bolts 238 that slide within slots 240. The shoulder bolts 238 and the slots 240 can restrict the contraction and expansion of the press components 106, 108, and can prevent the fluid pressure from pushing the inner housing 202 completely out of the outer housing 204. According to one or more implementations of the present invention, the length of the slots 240 can correspond with the length of the low-friction section 228 of the sliding seal 220. In particular, the slots 240 and shoulder bolts 238 can help ensure that the radial seal component 222 slides only along the low-friction section 228.

As mentioned previously, the fluid pressure within the upper and lower press components 106, 108 can act on the platens 206 to create uniform or substantially uniform pressure across the outer surfaces of a laminate assembly 112. As shown in FIGS. 2A-2B, the platens 206 can act directly against the outer surfaces of the laminate assembly 112. According to alternative implementations, however, a manufacturer can place one or more of release paper, texture paper, or a caul plate between the platens 206 and the outer layers of the laminate assembly 112.

As mentioned previously, in at least one implementation, the platens 206 can be flexible. As used herein the term "flexible platen" means a platen formed from a material that is at least partially rigid, but that can also reversibly flex, bend, or deflect in small degrees in one or more directions in response to applied pressure. For example, a flexible platen according to one or more implementations of the present invention includes at least a portion that can flex or bend away from a planar configuration.

Along these lines, FIGS. 2A and 2B illustrate that each of the platens 206 can comprise a relatively thin sheet of material, such as a sheet of aluminum (or similarly conductive and/or flexible metal or composite). In particular, in one or more implementations of the present invention, the platens 206 can each comprise a sheet of having a thickness of between about ⅛ inch and about ½ inch. Thus, a manufacturer can size and configure the gauge of the platens 206 to provide the platens 206 with a small degree of flexibility.

Additionally, according to one or more implementations of the present invention the platens 206 can include one or more features to maintain or provide rigidity thereto. For example, as illustrated in FIGS. 2A and 2B, the platens 206 can include a plurality of fluid channels 242, which in addition for use in cooling and/or heating the platens 206, can provide the platens 206 with rigidity. Additionally, as explained in greater detail with reference to FIG. 7 below, one or more platens 206 can include one or more ridges 712, which can increase the rigidity of the platens 206.

One will appreciate in light of the disclosure herein that the fluid pressure generated by the fluid actuator 116 can work in tandem with the flexibility of the platens 206 to help ensure a uniform or substantially uniform distribution of pressure across a laminate assembly 112. For example, as the fluid actuator 116 pressurizes the press components 106, 108 with fluid, the fluid pressure acting on the platens 206 can cause the platens 206 to flex, bend, or deflect in small amounts about the laminate assembly 112, and thus enable the platens 206 to conform to any corresponding imperfections or contours in the laminate assembly 112. Therefore, the platens 206 of one or more implementations can perform a similar function and replace conventional pressure pads and tooling plates. As discussed herein above, the elimination of pressure pads and tooling plates can increase press processing speed, and otherwise increase the efficiency of a lamination process.

Additionally, the ability of the platens 206 to flex can allow the platens 206 to adjust or compensate for the processing of some non-planar materials, such as non-planar lamination materials. In particular, the platens 206 can flex about larger three-dimensional objects, such as the larger pieces of thatch of the image layer 234, to prevent portions of the decorative image layer from receiving the a disproportionate amount of the platen pressure generated by the press assembly 104. Thus, the platens 206 according to one or more implementations can efficiently laminate three-dimensional objects between resin sheets, while also reducing or eliminating most, if not all, crushing and flattening of any larger three-dimensional objects, due to disparately applied forces.

Also, the flexibility of the platens 206 can help eliminate or reduce air pockets and air bubbles in a resulting unitary product 250. In particular, the flexibility of the platens 206 can help push or force air bubbles out from in between the layers of the laminate assembly 112 as the platens 206 apply pressure to the laminate assembly 112. For example, by adjusting and flexing as the layers of a laminate assembly 112 melt and form together, the platens 206 can help ensure that uniform or substantially uniform pressure is applied to the laminate assembly 112. By applying uniform or substantially uniform pressure across the laminate assembly 112, the platens 206 can help reduce or prevent low pressure areas in the laminate assembly 112, such as for example, between and about the decorative image layer 234, where air bubbles tend to form.

According to one or more implementations, the platens 206 can also allow for the production of a smooth and flat final product 250. For example, the fluid actuator 116 can create a vacuum within the press components 106, 108 that withdraws the platens 206 into the inner housings 202. As the fluid actuator 116 increases the fluid pressure within the press components 106, 108, the fluid pressure can force the platens 206 out of the inner housings 202 and against the laminate assembly 112. As fluid pressure forces the heated platens 206 against the laminate assembly 112, the flexible, yet rigid platens 206 can flatten and smooth out the laminate assembly 112 to create a smooth, unitary product 250 of substantially uniform gauge.

Additionally, the platens 206 of one or more implementations of the present invention can help reduce or eliminate scratching, roughening, and other deformation to the platens 206. For example, according to one or more implementations, the platens 206 can flex and bend about objects that may scratch or otherwise permanently deform the platens 206. Thus, the flexibility of the platens 206 can increase the life span of the platens 206, and thus, reduce overhead costs and increase processing efficiency by reducing the need to change platens or compensate for platen damage.

Figure 3:
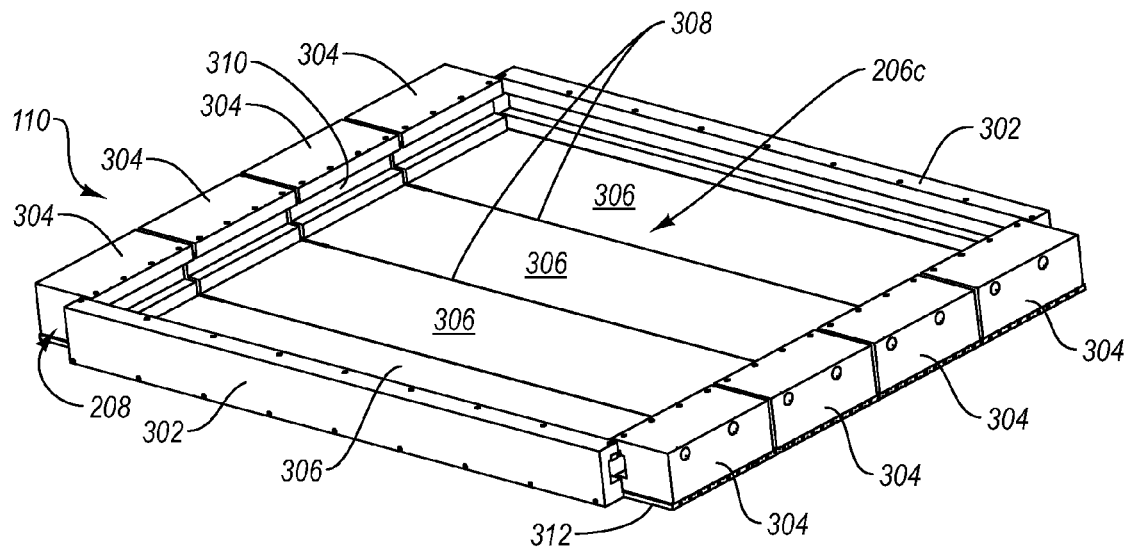
FIG. 3 illustrates a top, perspective view of a platen assembly in accordance with an implementation of the present invention.

As mentioned above, the platens 206 may comprise thin sheets of a material that provides rigidity and a degree of flexibility. Furthermore, according to one or more alternative or additional implementations, the platens 206 can have a modular configuration that provides flexibility. For example, FIG. 3 illustrates a platen assembly 110 according to one or more implementations of the present invention that includes a platen 206c comprising a plurality of coupled platen extensions 306. The platen 206c can include a plurality of joints 308 coupling the plurality of platen extension 306 together. The joints 308 can allow the platen extensions 306 to pivot relative to each other, and can provide the platen 206c with flexibility.

For example, according to one or more implementations of the present invention the joints 308 between the platen extensions 306 can comprise a tongue and groove configuration. The tongue and groove configuration can provide the platen 206c with rigidity, while also allowing the platen extensions 306 to pivot towards and away from a planar configuration. In one or more alternative implementations of the present invention, the joints 308 can include a half lap joint or other joint that allows the platen extensions 306 to pivot relative to each other. FIG. 3 also illustrates that the plurality of joints 308 can join the platen extensions 306 together to form a substantially planar surface 312 configured to apply pressure to a side of a laminate assembly.

One will appreciate in light of the disclosure herein that in addition to flexing relative to each other along the plurality of joints 306, each of the platen extensions 306 can flex along their length. The ability of the platen extensions 306 to flex along their length can be due at least in part to the material and gauge of the platen extensions 306. In addition to providing the platen 206c with flexibility, the modular configuration of the platen 206c can allow a manufacturer to relatively easily replace damaged or deformed platen extensions 306 without requiring replacement of an entire platen. Thus, one will appreciate in light of the disclosure herein that the modular configuration of the platen 206c can allow for relatively quick and easy repair.

FIG. 3 further illustrates that in addition to the modular configuration of the platen 206c, the entire platen assembly 110 can have a modular configuration. For example, FIG. 3 illustrates that the frame assembly 208 can include side sections 302 that can span the length of the platen extensions 306 and provide support to the outer edge of the platen 206c. FIG. 3 also illustrates that the frame assembly 208 can include a plurality end sections 304 corresponding in width to the platen extensions 306.

The modular configuration of the platen assembly 110 can allow a manufacturer to size or resize the lamination press 100. For example, the manufacturer can add or replace platen extensions 306 and associated end sections 304 to increase the length of the platen 206c. Thus, according to one or more implementations, a manufacturer can size a single lamination press 100 to process a wide variety of laminate assembly 112 sizes. For example, a manufacturer can configure the number of platen extensions 306 so the lamination press 100 can process 4 foot by 8 foot resin sheets, or resin sheets having larger or smaller dimensions. In addition to allowing relatively easy resizing and reconfiguration, the modular construction of the platen assembly 110 can also allow a manufacturer to dissemble, move, and reassemble the lamination press 100. The ability to relatively easily move a lamination press 100 can provide an appreciable advantage.

As shown in FIG. 3, each of the end sections 304 of the platen frame assembly 208 can include an alignment groove 310. The alignment groove 310 can allow a manufacturer to secure the platen assembly 110 to the inner housing 202 (FIGS. 2A-2B), and help ensure that proper alignment during assembly, resizing, or moving of the lamination press 100. One will appreciate in light of the disclosure herein that proper alignment of the platen extensions 306 can help ensure the press components 106, 108 are fluid tight.

Figure 4:
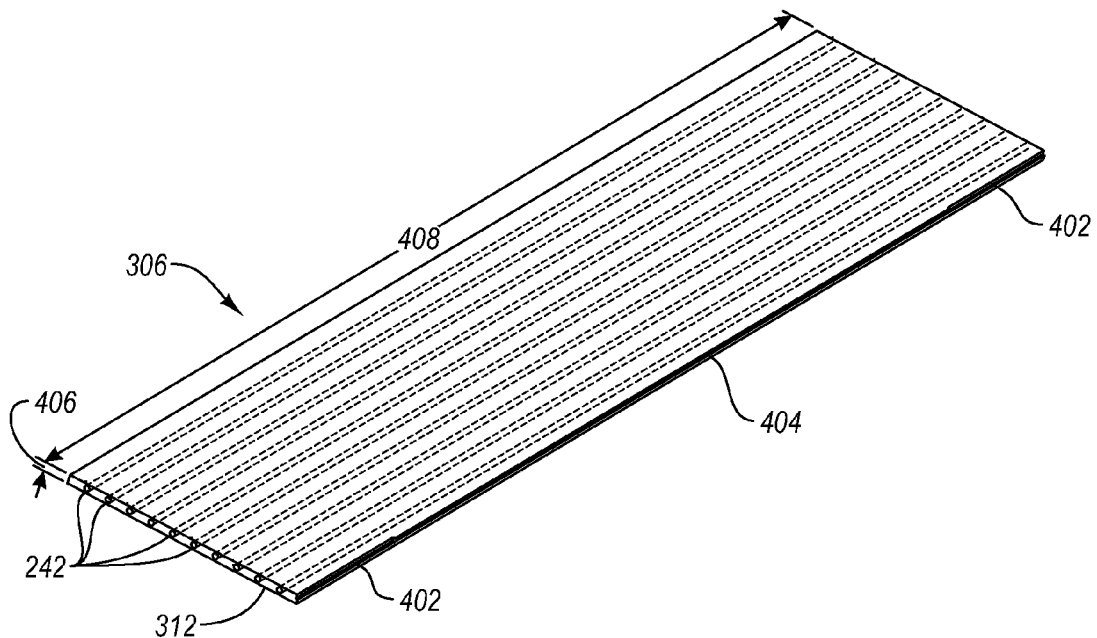
FIG. 4 illustrates a top, perspective view of a platen extension in accordance with an implementation of the present invention.

In addition to the alignment grooves 310, the platen assembly 110 can include one or more seals between each of the platen extensions 306 to help ensure that the platen 206c is fluid tight. For example, FIG. 4 depicts a top, perspective view of a platen extension 306. FIG. 4 illustrates that each platen extension 306 can include a thickness or gauge 406 and a length 408. The platen extension 306 can include a seal assembly comprising a center seal 404 and two end seals 402 positioned along the outer edges and running along the length 408 of each platen extension 306. The center seal 404 can form part of the joint 308 between platen extensions 306, and can help ensure fluid does not pass between the platen extensions 306 as they flex or pivot relative to each other. The end seals 402 can create a fluid tight coupling between the platen extension 306 and the corresponding end sections 304 of the platen frame assembly 208.

In addition to providing flexibility, rigidity, and a fluid tight surface, the configuration of the platen extensions 306 can also aid in reducing heating and cooling processing times. For example, as mentioned previously the platens 206, and platen extensions 306, can have a relatively thin gauge or thickness 406. In particular, in one or more implementations of the present invention, the platen extensions 306 can each have a thickness 406 of between about ⅛ inch and about ½ inch.

This is in contrast to conventional platens that have a thickness of two or more inches due to the need of heat retention, strength, and weight.

The relatively small thickness 406 of the platen extensions 306 of one or more implementations of the present invention can not only provide the platens 206 with flexibility, but also allows the lamination press 100 to heat and cool the platens 206 rapidly. Indeed, the smaller the thickness 406 of the platen extensions 306, the quicker the press can heat and cool the platens 206. Along similar lines, the smaller the thickness 406 of the platen extensions 306, the lesser amount of energy, and thus, expense required to both heat and cool the platens 206.

In addition to the thickness 406 of the platen extension 306, a manufacturer can select the material of the platen extensions 306 and the platens 206 to aid in reducing heating and cooling times. Indeed, according to one or more implementations of the present invention, the platen extensions 306 and platens 206 can comprise a material having a high thermal conductivity, which can allow the lamination press 100 to rapidly heat and cool the platens 206. For example, according to one or more implementations of the present invention, the platen extensions 306 and platens 206 can comprise copper, aluminum, mixtures and alloys thereof, or a similarly conductive metal or composite. One will appreciate in light of the disclosure herein that such materials can have a thermal conductivity of approximately five times or more that of cast iron. In addition to allowing for quicker heating and cooling, the highly thermal conductive material of the platens 206 can allow for rapid temperature changes of the platens 206.

As mentioned previously, each platen 206 can include a plurality of fluid channels for cooling and/or heating the platen 206. For example, FIG. 4 illustrates that each platen extension 306 can include a plurality of fluid channels 242 extending within the thickness 406 thereof. According to one or more implementations, the fluid channels 242 can have a linear configuration, and extend from a first end, along the entire length 408 of the platen extension 306, to an opposing end. In one or more alternative implementations of the present invention, the fluid channels 242 may have a serpentine configuration and/or extend along only a portion of the length 408 of the platen extension 306.

In any event, the Figures show that each platen extension 306 can include a plurality of fluid channels 242 extending therein. For example, FIG. 4 illustrates that the platen extension 306 can include ten fluid channels 242. One will appreciate in light of the disclosure herein, however, that each platen extension 306, and each platen 206, can include more or less than ten fluid channels. According to one or more implementations, a manufacturer can configure the number of fluid channels 242 depending upon whether they are used for cooling and heating the platens 206, and the particular type of heating.

For example, as explained in greater detail hereinafter, the press 100 can use the same fluid channels 242 to both cool and heat the platens 206. In one or more additional or alternative implementations, the press 100 can use one set of fluid channels 242 to heat the platens 206 and another set to cool the platens 206. In yet further implementations, the press 100 can use the fluid channels 242 only to cool, and not to heat the platens 206. Thus, depending upon the heating method, a manufacturer can adjust the number of fluid channels 242 accordingly.

In at least one implementation, the press 100 can heat the platens 206 by passing a heating medium through the fluid channels 242, and can cool the platens 206 by passing a cooling medium through the fluid channels 242. For example, in at least one implementation, the heating source 120 can pump hot steam or water through the fluid channels 242 to heat the platens 206. In such a case, the cooling source 118 can pump a cold fluid, such as cold water or air, through the same fluid channels 242 to cool the platens 206.

In alternative implementations, the heating source 120 can pump hot oil through a first set of fluid channels 242 to heat the platens 206; while the cooling source 118 can pump cold water or glycol through a second set of fluid channels 242 to cool the platens 206. In this case, a cooling fluid channel 242 can separate each heating fluid channel 242. The staggering of the heating and cooling fluid channels 242 can allow for even heating and cooling of the platens 206.

Furthermore, to increase the speed of cooling and/or heating the platens 206, the lamination press 100 can pass the cooling/heating medium in both directions across the platens 206. For example, the cooling/heating source 118/120 can pump a cooling/heating medium through one half of the fluid channels 242 in a first direction, and can pump a cooling/heating medium through the other half of the fluid channels 242 in a second opposing direction. The cross flow of the cooling/heating medium can increase the cooling/heating of the platens 206. Furthermore, the cross flow of cooling/heating medium can help prevent one side or area of the platens 206 cooling quicker than the other. In other words, the lamination press 100 can cool/heat the platens 206, and the laminate assembly 112, from the outside in.

In addition to the foregoing, each of the platens 206 can include electric heaters embedded between the fluid channels 242. In such a case, the heating source 120 can supply power to the electric heaters to heat the platens 206. In such implementations of the present invention, the lamination press 100 can use all of the fluid channels 242 to cool the platens 206 as described hereinabove.

In the implementations of the present invention in which the lamination press 100 uses all of the fluid channels 242 to cool the platens 206, or even in the other implementations described herein, the cooling source 118 can circulate cold water to cool the platens 206. Additionally, to speed up the heating process after a cooling cycle, the lamination press 100 can pass air through the fluid channels 242 to purge any water or vapor from the fluid channels 242. The purging of any water or vapor from the fluid channels 242 can speed up the subsequent heating of the platens 206 by eliminating the need to boil the water or vapor from the fluid channels 242. Additionally, purging the fluid channels 242 with air prior to heating the platens 206 can keep the fluid channels 242 clean and prevent the buildup of residue over time.

Figure 5:
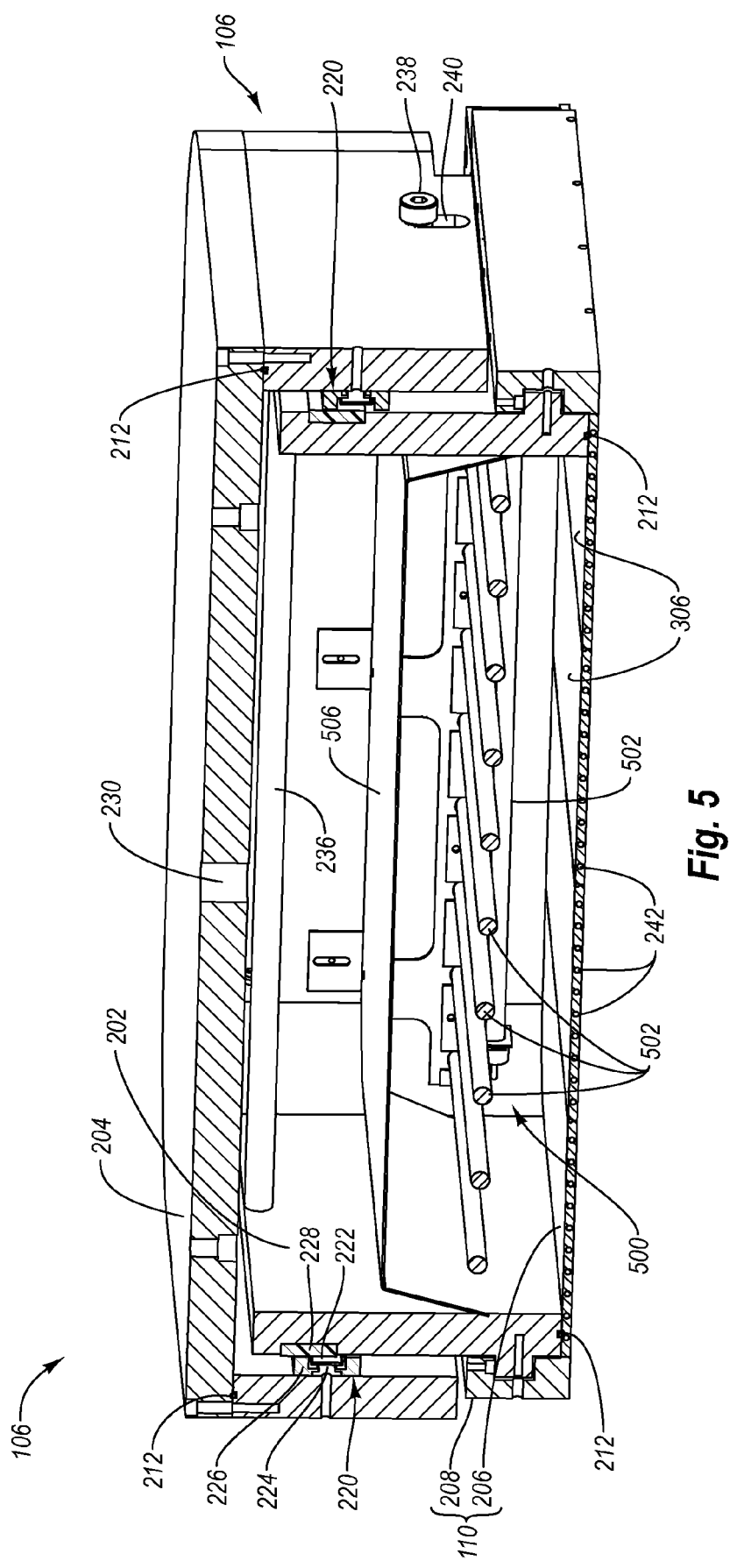
FIG. 5 illustrates a side perspective, cross-sectional view of an upper press assembly including a radiant heating assembly in accordance with an implementation of the present invention.

According to one or more implementations of the present invention, the press 100 can heat the platens 206, and thus a layup stack 112, using a radiant heating assembly. For example, FIG. 5 illustrates a side perspective, cross-sectional view of a press component 106 including a radiant heating assembly 500. The radiant heating assembly 500 can heat the platens 206 through radiant instead of conduction, convection, or combinations thereof. By heating the platens 206 using radiant heating, the radiant heating assembly 500 can help reduce or eliminate "hot spots" and "cold spots." Thus, according to one or more implementations of the present invention, the radiant heating assembly 500 can uniformly or substantially uniformly heat the platens 206 of a lamination press 100.

For example, FIG. 5 illustrates that the radiant heating assembly 500 can include a plurality of radiant heating elements 502 positioned behind the platen 206. The plurality of radiant heating elements 502 can emit energy through radiant, which is then absorbed by the platen 206 and transferred to a laminate assembly 112. According to one or more implementations of the present invention, the radiant heating elements 502 can comprise infrared heaters. For instance, the heating elements 502 can comprise heaters, such as, for example, quartz heating elements, ceramic infrared heating elements, or metal sheathed infrared heaters. As shown in FIG. 5, in one or more implementations of the present invention, the plurality of radiant heating elements 502 can comprise halogen lamps.

One will appreciate in light of the disclosure herein that the inner housing 202 can include various features and materials to aid in the radiant heating of the platen 206. For example, according to one or more implementations of the present invention, the inner housing 202 can include a reflective ceramic material to aid in the diffusion of heat within the inner housing 202. Additionally, FIG. 5 illustrates that the heating assembly 500 can include a reflector plate 506. The reflector plate 506 can reflect heat emitted by the heating elements 502 toward the platens 206.

In addition, a manufacturer can apply a material to a surface of the platen 206 in order to create a highly absorptive surface with low reflectivity/low emissivity. In an implementation of the present invention, for example, the manufacturer can coat the back of the platen 206 with black chrome due to its ability to increase energy absorption. Such a highly absorptive surface can facilitate quick and efficient heating of the platen 206, particularly when the platen 206 comprises a material with a high thermal conductivity, such as aluminum.

One will appreciate in light of the disclosure herein that the radiant heating elements 502 of the heating assembly 500 can work in conjunction with the high thermal conductivity of the platen 206 to allow for rapid heating and cooling of the platen 206 and a laminate assembly 112. In particular, this combination can rapidly heat the platen 206 to desired temperature and with greater precision than is generally possible with conventional presses. These heating abilities, when combined with the ability to quickly cool the platen 206, can allow a single component press to both heat and cool a laminate assembly 112 quickly and efficiently.

Figure 6:
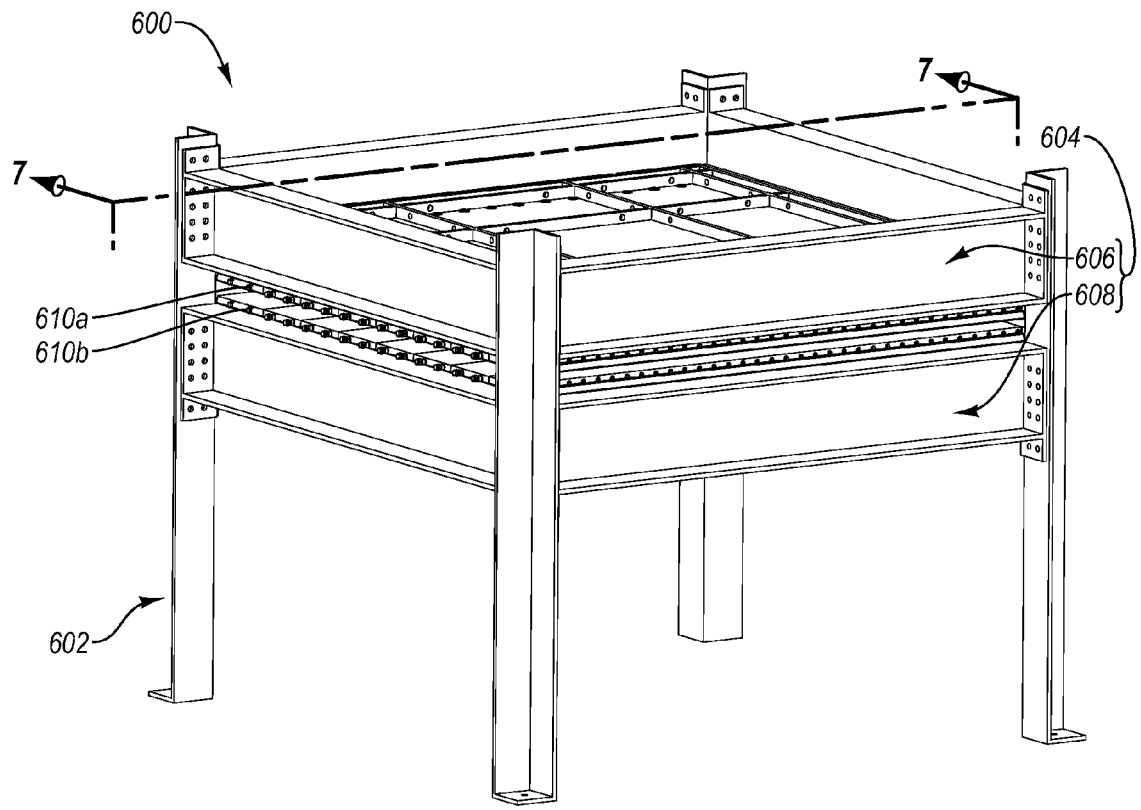
FIG. 6 illustrates a perspective view of another lamination press in accordance with an implementation of the present invention.

Additionally, the uniform fluid actuation of a platen and the various other inventive aspects of the present invention can be implemented in a number of different forms using a wide variety of components. For example, FIG. 6 illustrates another implementation of a lamination press 600 capable of rapidly and efficiently forming a panel product with excellent structural and aesthetic properties. In particular, FIG. 6 shows that the lamination press 600 can include a frame 602 for supporting or mounting one or more press assemblies. For instance, FIG. 6 shows that the lamination press 600 can include at least one press assembly 604 including an upper press component 606 and a lower press component 608. The upper press component 606, in turn, can each comprise an upper platen assembly 610a, while the lower press component 608 can comprise a lower platen assembly.

Figure 7:
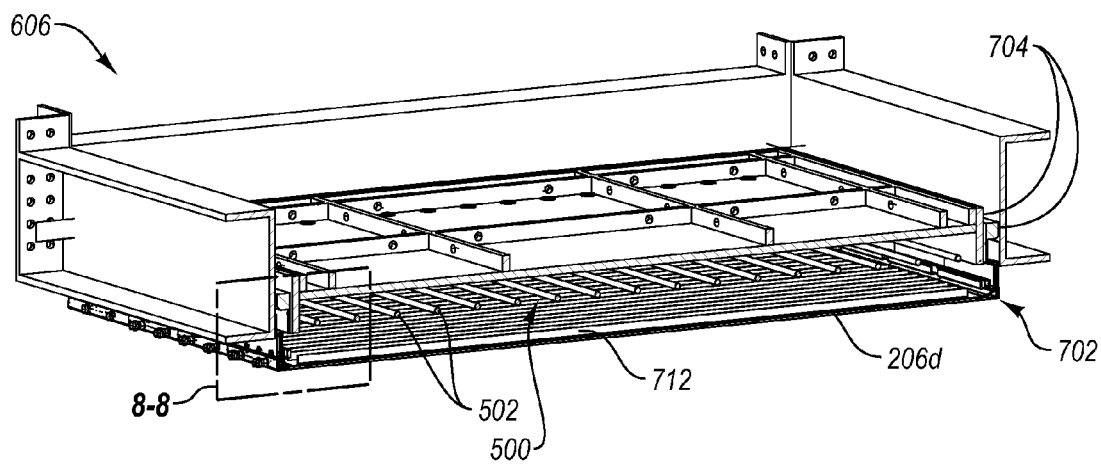
FIG. 7 illustrates a side perspective, cross-sectional view of a press assembly of the lamination press of FIG. 6 taken along the line 7-7 of FIG. 6.

FIG. 7 illustrates a side perspective, cross-sectional view of the upper press component 606. One will appreciate, however, that the lower press component 608 can have the same configuration, although mirrored. FIG. 7 illustrates that the press component 606 can comprise an expandable and retractable box. In particular, at least one implementation of the press component 606 can include an inner housing 702 movably coupled to an outer housing 704. Additionally, the press components 606 can include a platen 206d coupled to the inner housing 702.

The platen 206d can comprise a similar configuration as the platens 206 shown and described above; however, FIG. 7 illustrates that the platen 206d may include a plurality of ridges 712. The plurality of ridges 712 can add rigidity and support to the platen 206d. In one implementation, both the upper and lower platens 206 of a press assembly 104, 604 can include ridges. In additional or alternative implementations, only the lower platen 206 may include ridges 712. When the lower platen 206 includes ridges 712, the ridges 712 can provide support to a molten or softened resin or substrate. For example, the ridges 712 can help ensure the pressing and heating processes begin with the laminate assembly 112 in a substantially flat and planar configuration.

Additionally, in at least one implementation, the plurality of ridges 712 can facilitate quicker and more uniform heat distribution. For example, the plurality of ridges 712 can provide a platen 206d with an increased surface area to absorb heat from a radiant heating assembly 500. Furthermore, the plurality of ridges 712 can help allow a platen 206d to cool quicker by acting as cooling fins. As shown in FIG. 7, in at least one implementation, the plurality of ridges 712 can be integral with and extend from the back side of the platen 206d. Alternatively, the plurality of ridges 712 can comprise a separate assembly upon which the platen 206d may rest. In such a case, a manufacturer can selectively add or remove the plurality of ridges 712 from a press assembly 604.

FIG. 7 also illustrates that the press component 606 can also include a radiant heating assembly 500 having a plurality of radiant heating elements 502. One will appreciate, however, in one or more additional or alternative implementations, the press component 606 can include one of the other mechanisms described herein above for heating the platens 206. In any event, the press 600 can include the ability to rapidly heat the platens 206d. Similarly, the platen 206d can include a plurality of fluid channels 242 through which the press 600 may pump or circulate a cooling medium to rapidly cool the platens 206d.

Figure 8A:
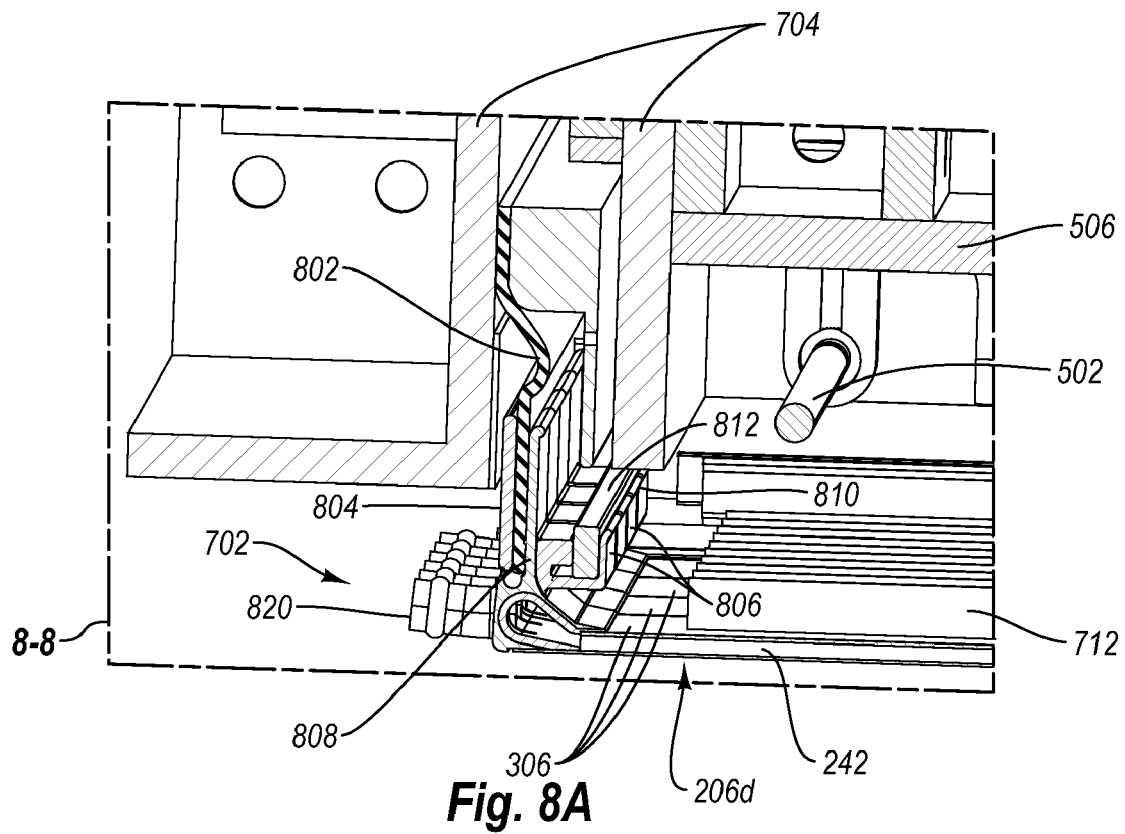
FIG. 8A illustrates an enlarged, front facing view of the portion of the press assembly of FIG. 7 within the rectangle 8-8 of FIG. 7, in contracted configuration in accordance with an implementation of the present invention.

Referring now to FIG. 8A-8A, these Figures provide close-up views of the portion of the press component 606 in the box 8-8 of FIG. 7. The press component 606 can comprise a fluid tight box similar to the press components 106, 108 described hereinabove. Thus, a fluid actuator 116 can regulate the amount of a fluid within the press component 606 to expand or contract the press component 606, and to control the amount of platen pressure exerted on a laminate assembly 112. In contrast to the press components 106, 108, however, the press component 606 may or may not include a sliding seal 202. In one implementation, in place of a sliding seal 202, the press component 606 can include an expandable and retractable bladder 802. The fluid actuator 116 can, in turn, expand or retract the bladder 802 by regulating the fluid pressure within the press component 606, as explained in greater detail below.

Figure 8B:
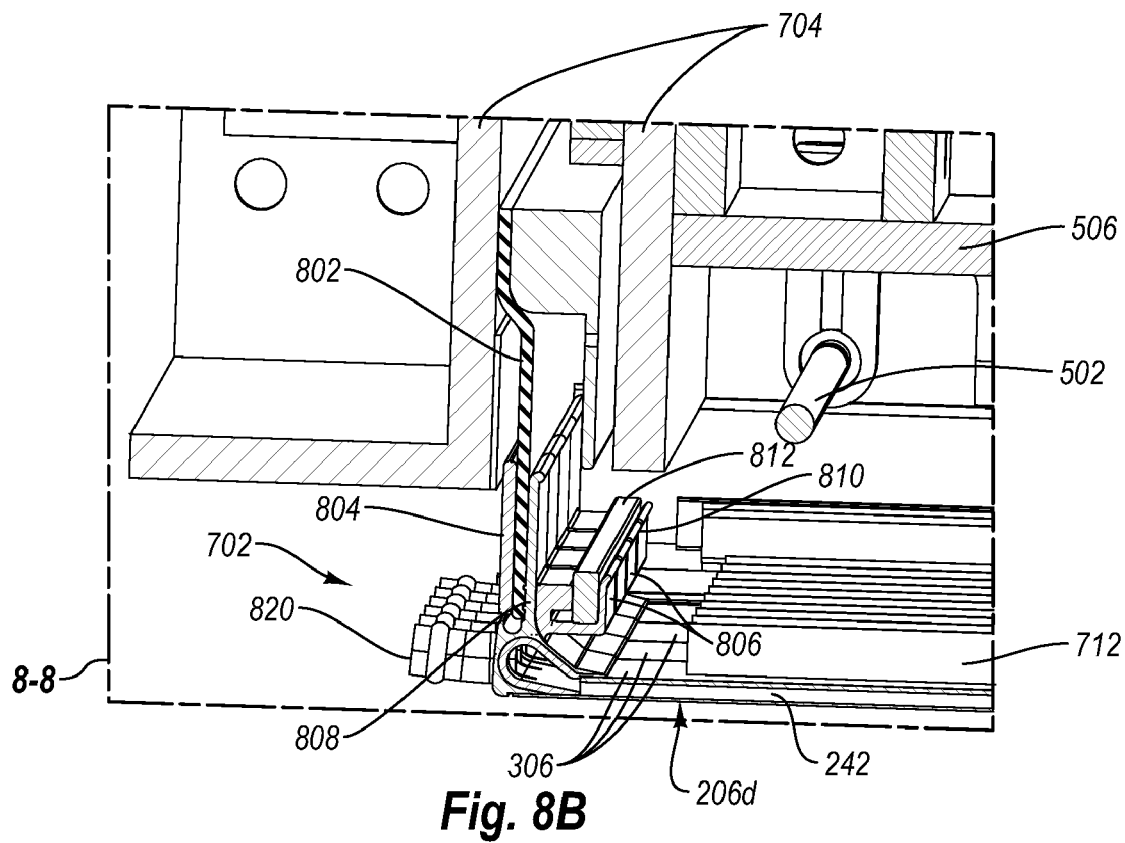
FIG. 8B illustrates an enlarged front facing view of the portion of the upper press assembly of FIG. 7 within the rectangle 8-8 of FIG. 7, in an expanded configuration in accordance with an implementation of the present invention.

As mentioned previously, the press component 606 can include a lower housing 702 movably coupled to an upper housing 704. Additionally, in the implementation illustrated in FIGS. 8A-8B, the lower housing 702 can also function as a frame assembly by supporting the edges of the platen 206d. FIGS. 8A-8B show that the platen 206d and the inner housing or platen frame assembly 702 can have a modular configuration. For example, the platen 206d may comprise a plurality of platen extensions 306 flexibly coupled together. While, the inner housing/platen frame assembly 702 can include a plurality of modular frame segments 806 corresponding to the plurality of platen extensions 306.

Each of the frame segments 806 can include an alignment slot 810, within which a manufacturer can place an alignment bar 812. Thus, the alignment bar 812 can run through the slot 810 provided by each frame segment 806 of the inner housing/frame assembly 702. In one implementation, therefore, the alignment bar 812 effectively ties each frame segment 806 together with other segments 806, and provides alignment between the segments 806. One will appreciate in light of the disclosure herein that proper alignment of the frame segments 806 and the platen extensions 306 can help ensure a fluid tight press component 606.

FIGS. 8A-8B further show that the frame segments 806 can comprise a plurality of inlet and exhaust ports 820. In one implementation, ports 820 can facilitate the flow of cooling and/or heating mediums through the fluid channels 242 of the platen 206d. Thus, the plurality of inlet and exhaust ports 820 can link to a plurality of tubes connecting the inner housing/platen frame assembly 702 to a cooling source 118 and/or a heating source 120.

As mentioned previously, a bladder 802 can moveably couple the inner housing/frame assembly 702 and the platen 206d to the outer housing 704. For example, FIGS. 8A-8B illustrate that the inner housing/frame assembly 702 can secure a lower end of the bladder 802 between a body 808 and a bladder restraint 804. The outer housing 704 in turn can hold or secure the upper end of the bladder 802. In at least one implementation, the bladder 802 can run along and between all four sides of the upper and lower housings 704, 702, forming a complete envelope around the platen 206c. Thus, the bladder 802 can secure the platen 206d to the outer housing 704, while also allowing the platen 206d to freely float. Furthermore, the bladder 802 can allow the press component 606 to remain fluid tight while the press component 606 expands and contracts.

The bladder 802 can thus allow a fluid actuator 116 to regulate a quantity of a fluid within the press component 606. For example, the fluid actuator 116 can increase or decrease the pressure within the press component 606 to cause the press component 606 to expand or contract. In particular, the fluid pressure can act on the platen 206d and force the bladder 802 to move from a retracted configuration (Figure A) to an expanded configuration (FIG. 8B). The expansion of the press component 606 can also actuate the platen 206d to press a laminate assembly 112 (e.g., FIG. 2B). Along similar lines, the fluid actuator 116 can reduce the fluid pressure, or create a vacuum, in the press component 606 to cause the bladder 802 to retract, at least partially, into the press component 606 (FIG. 8B). The retraction of the bladder 802 can thus move the inner housing/frame assembly 702 towards the outer housing 704, and thus, reduce the pressure on a laminate assembly 112.

One will appreciate in light of the disclosure herein that by increasing the fluid pressure within the press component 606, the fluid actuator 116 can apply uniform or substantially uniform pressure across the entire surface area of the platen 206d. Additionally, the uniform or substantially uniform distribution can cause the platen 206d to flex, bend, or deflect in small amounts about the laminate assembly 112, which in turn can help to distribute uniform or substantially uniform pressure across the outer layers of a laminate assembly 112. As mentioned above, combination of the uniform or substantially uniform distribution of pressure and the flexibility of the platen 206d can reduce or eliminate the need for pressure pads and tooling plates, increase press processing speed, allow the platen 206d to adjust or compensate for the processing of non-planar materials, help eliminate or reduce air pockets and air bubbles in a resulting unitary product 250, and otherwise increase the efficiency of a lamination process.

Figure 9:
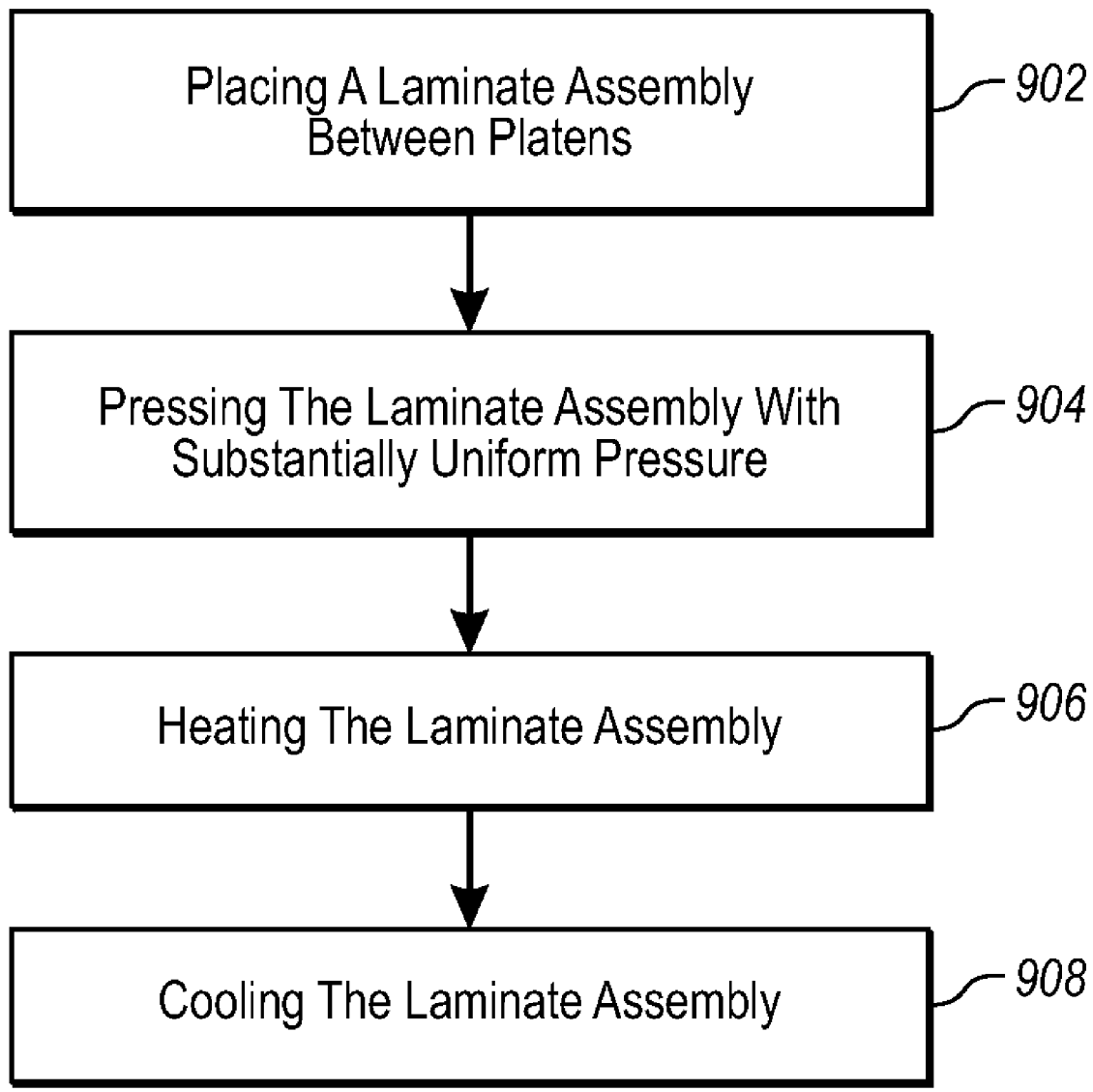
FIG. 9 illustrates a flowchart of a series of acts in a method in accordance with an implementation of the present invention of forming a unitary product by applying heat and pressure to a laminate assembly.

Accordingly, FIGS. 1-8B, and the corresponding text, provide a number of different components and mechanisms for forming a structurally sound resin panel in a rapid and efficient manner. In addition to the foregoing, implementations of the present invention can also be described in terms one or more acts in a method for accomplishing a particular result. For example, FIG. 9 illustrates a flowchart of one exemplary method for applying uniform heat and pressure to a laminate assembly 112 to produce a resulting unitary decorative architectural resin panel 250 in accordance with the principles of the present invention. The acts of FIG. 9 are described below with reference to the components and diagrams of FIGS. 1 through 8B.

For example, FIG. 9 shows that the method of forming a decorative architectural resin panel can comprise an act of placing a laminate assembly between platens. Act 902 can involve placing two or more layers between opposing platens of a lamination press. For example, FIG. 2A shows that a manufacturer positions a first resin sheet 232 on the lower platen 206b of a press assembly 104, a decorative image layer 234, and a second resin sheet 236 on or about the decorative image layer 234 to form a laminate assembly 112.

FIG. 9 also shows that a method in accordance with an implementation of the present invention can comprise an act 904 of pressing the laminate assembly with substantially uniform pressure. Act 904 can involve pressing the laminate assembly together by applying substantially uniform fluid pressure across at least a majority of the opposing platens to close a distance between the opposing platens. For example, FIGS. 2A-2B illustrate that a fluid actuator 116 (FIG. 1) can pump fluid through tubes (not shown) into one or more holes 230 formed in upper and lower press components 106, 108. The fluid can pressurize the upper and lower press components 106, 108, distributing uniform fluid pressure across at least a majority of the upper platen 206a and the lower platen 206b. As fluid fills the upper and lower press components 106, 108, the platens 206 can apply uniform or substantially uniform pressure across the layers of the laminate assembly 112, pressing them together.

In one or more implementations of the present invention, act 904 can also involve increasing the pressure exerted on the laminate assembly by expanding one or more press components. For instance, FIGS. 2A and 2B illustrate that the fluid actuator 116 can further increase the fluid pressure within the upper and lower press components 106, 108 causing one of more of the upper platen 206a and the lower platen 206b to move towards each other. In particular, fluid actuator 116 can increase the fluid pressure to cause the inner housings 202 (and associated platen 206) to slide a distance "d" along the sliding seals 220 from an un-expanded configuration (FIG. 2A) to an expanded configuration (FIG. 2B). The expansion of the press components 106, 108 can increase the platen pressure exerted on the laminate assembly 112.

Act 904 can alternatively involve increasing the pressure exerted on the laminate assembly by expanding a bladder. For example, FIGS. 8A and 8B illustrate that the fluid actuator 116 increases the fluid pressure within the press components 606, 608, causing the inner housings 702 of the press components 606, 608, and the associated platens 206, to move towards each other. In particular, fluid actuator 116 can increase the fluid pressure to expand a bladder 802 securing the inner housings 702 to the outer housing 704. The expansion of the bladder 802 can allow the inner housings 702 to float from an un-expanded configuration (FIG. 8A) to an expanded configuration (FIG. 8B), thereby increasing the platen pressure exerted on the laminate assembly 112.

In one or more implementations of the present invention, act 904 can further comprise the act of causing one or more of the upper platen and the lower platen to flex about one or more contours in the one or more surfaces of the laminate assembly thereby applying substantially uniform pressure across one or more surfaces of the laminate assembly. Act 904 can involve applying substantially uniform fluid pressure across a flexible platen causing the platen to form, at least partially, with the contours of resin sheets as they melt and form together. For example, the fluid actuator 116 can pressurize the press components 106, 108, 606, 608 causing thin, aluminum platens 206 to flex or bend in small degrees. Additionally, or alternatively, one or more platen extensions 306 of the platens 206 can pivot or flex relative to each other about a contour in the laminate assembly, thereby applying substantially uniform pressure across outer surfaces 232, 236 of the laminate assembly 112, even when the laminate assembly is not substantially planar.

In addition, FIG. 9 shows that a method in accordance with an implementation of the present invention can comprise an act 906 of heating the laminate assembly. Act 906 can involve heating the laminate assembly by heating the opposing platens. For example, referring to FIG. 4, a heating source 120 can pump a heating medium (hot steam, water, oil, or other heated fluids) through the fluid channels 242 formed in the platen 206. In one or more implementations of the present invention, the heating source 120 can pass the heating medium in both directions across the platens 206. For example, the heating source 120 can pump a heating medium through one half of the fluid channels 242 in a first direction, and can pump a heating medium through the other half of the fluid channels 242 in a second opposing direction. Alternatively, act 906 can involve heating the platen 206 via one or more electric heaters embedded therein.

Still further, act 906 can involve heating the laminate assembly by radiating the opposing platens with one or more radiant heating elements, such as halogen lamps. For example, FIG. 5 illustrates that a plurality of heating elements 502 can emit energy through radiant, which is then absorbed by the platens 206 and transferred to a laminate assembly 112. In such implementations of the present invention, the radiant emitted by the plurality of heating elements 502 can uniformly or substantially uniformly heat the platens 206 in a rapid, yet precise manner.

In any event, act 906 can involve heating the laminate assembly 112 without having to transfer heat through pressure pads or tooling plates. For example, FIGS. 2A and 2B illustrate that heat can transfer directly from the platens 206 to the laminate assembly 112 without having to pass through any intermediate layers. In one or more alternative implementations of the present invention, the heat form the platens 206 may pass through a caul plate, release paper, or texture paper prior to transferring to the laminate assembly 112. In either case, the platens 206 can rapidly and effectively heat the laminate assembly 112. For example, the entire heating of act 906 can comprise eight minutes or less according to one or more implementations of the present invention.

Furthermore, FIG. 9 shows that the method can comprise an act 908 of cooling the laminate assembly. Act 908 can involve cooling the laminate assembly by cooling the opposing platens of the laminate assembly. For example, referring to FIG. 4, a cooling source 118 (FIG. 1) can pump a cooling medium (water, air, or other cooled fluids) through the fluid channels 242 formed in the platen 206. In one or more implementations of the present invention, the cooling source 118 can pass the cooling medium in both directions across the platens 206. For example, the cooling source 118 can pump a cooling medium through one half of the fluid channels 242 in a first direction, and can pump a cooling medium through the other half of the fluid channels 242 in a second opposing direction.

Accordingly, the schematics and methods described herein can provide a number of ways for creating aesthetically pleasing, decorative, architecturally-suitable resin-based panels. As discussed herein, these resin panels can be substantially translucent or transparent in order to provide a desired aesthetic. Furthermore, the implementations of the present invention provide methods of creating decorative, architecturally-suitable resin-based panels without damaging the panels during processing.

In particular, implementations of the present invention can create structurally useful panels with excellent aesthetic characteristics, which have no bowing, warping, or edge rollover, since they are created in a manner that avoids non-uniform temperature and pressure gradients. This can be accomplished by applying heat and pressure uniformly and simultaneously to opposing sides of a laminate assembly, and ensuring that each surface has equal exposure to any heat sources.

Furthermore, one or more implementations of the present invention can greatly increase the processing speed and efficiency of forming resin panels. For example, the processing time of a ¼ inch resin panel using a conventional lamination press can include about 20 minutes of heating and pressing, about two minutes for transferring the laminate assembly from a hot press to a cold press, and about 20 additional minutes of cooling and pressing for a total processing time of over 40 minutes. In contrast, the processing time of a ¼ inch resin panel according to one or more implementations of the present invention can include about 8 minutes or less of heating and pressing, and about 2 minutes or less of cooling for a total processing time of about 10 minutes. Thus, in at least one implementation, the present invention can reduce the processing time of a resin panel to $\frac{1}{4}^{th}$ that of many conventional processes.

Notably, one or more implementations of the present invention also reduce energy waste. The heating assembly can apply energy to the platen assembly only when heat is required during a lamination process. Thus, no energy may be wasted by heating the press between jobs. Furthermore, one or more implementations of the present invention can apply uniform or substantially uniform pressure to a laminate assembly without the use of pressure pads or tooling plates, no energy is wasted through such intermediate layers.

Furthermore, the present invention may be embodied in other specific forms without departing from its spirit or essential characteristics. For example, in addition to the foregoing, one will appreciate that panels made in accordance with the present invention can be formed to a wide variety of shapes and dimensions. In addition, the structures and processes described herein can be deviated in any number of ways within the context of implementations of the present invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A lamination press configured to apply heat and uniform pressure to laminate assembly to rapidly and efficiently form a laminated product, comprising:
    an upper press component and a lower press component, each press component having a corresponding first or second flexible platen moveably coupled thereto;

one or more fluid actuators configured to pressurize one or more of the press components with fluid and apply uniform fluid pressure to one or more of the first and second flexible platens;

wherein one or more of the first and second flexible platens are configured to move toward the other of the first and second flexible platens and apply substantially uniform pressure to a laminate assembly as one or more of the upper press component and the lower press component are pressurized; and one or more heat sources configured to heat the first flexible platen and the second flexible platen;

wherein:

at least one of the first flexible platen or the second flexible platen comprises a plurality of platen extensions that are flexibly coupled together; and the plurality of platen extensions are configured to directly contact a surface of the laminate assembly to provide heat and pressure to the laminate assembly.

2. The lamination press as recited in claim 1, wherein the one or more fluid actuators comprises an air pump configured to pressurize the upper press component and the lower press component with air.

3. The lamination press as recited in claim 1, wherein the one or more heat sources comprises radiant heating elements positioned in the upper press component and the lower press component.

4. The lamination press as recited in claim 3, wherein the radiant heating elements comprise halogen lamps.

5. The lamination press as recited in claim 1, further comprising a plurality of linear fluid channels within the first flexible platen and within the second flexible platen.

6. The lamination press as recited in claim 5, further comprising a cooling source configured to cool the first flexible platen and the second flexible platen by pumping a cooling medium through the plurality of linear fluid channels.

7. The lamination press as recited in claim 1, wherein the first flexible platen and the second flexible platen are each comprise aluminum and have a thickness of between about 1/8 inch and about 1/2 inch.

8. The lamination press as recited in claim 1, wherein one or more of the first flexible platen and the second flexible platen comprises a plurality of ridges extending from a surface thereof.

9. A flexible platen for use in a lamination press for applying uniform pressure to a laminate assembly to form a unitary product, comprising:

a plurality of platen extensions, each comprising a first surface, an opposed second surface, and a thickness extending therebetween;

wherein:

the plurality of platen extensions is flexibly coupled together pivotably, so that the first surfaces of the plurality of platen extensions comprise a substantially planar, flexible surface configured to apply uniform pressure directly to a surface of a laminate assembly;

the flexible platen comprises part of at least one press component that is configured to press against an opposed press component comprising an opposed flexible platen; and the flexible platen and opposed flexible platen cooperate to apply pressure directly to opposing surfaces of the laminate assembly.

10. The platen as recited in claim 9, wherein each platen extension in the plurality is configured to pivot or flex relative to each adjacent platen extension.

11. The platen as recited in claim 9, wherein the thickness of each platen extension comprises between about 1/8 inch and about 1/2 inch.

12. The platen as recited in claim 9, wherein each platen extension comprises aluminum.

13. The platen as recited in claim 9, further comprising a plurality of linear fluid channels extending linearly through the thickness of each platen extension of the plurality of platen extensions.

14. The platen as recited in claim 9, further comprising a seal extending between adjacent platen extensions of the plurality of platen extensions.

15. A method for applying heat and pressure to a laminate assembly to form a unitary product comprising:

placing two or more layers between opposing platens of a lamination press, wherein at least one of the opposing platens comprises a plurality of flexibly coupled platen extensions configured to provide heat and pressure directly to the laminate assembly;

pressing the laminate assembly together by applying substantially uniform fluid pressure across at least a majority of the opposing platens to close a distance between the opposing platens, wherein at least two of the platen extensions pivot relative to each other during pressing;

heating the laminate assembly by heating the opposing platens; and cooling the laminate assembly by cooling the opposing platens of the laminate assembly.

16. The method as recited in claim 15, wherein the substantially uniform fluid pressure causes one or more of the opposing platens to flex about one or more contours in one or more surfaces of the laminate assembly thereby applying substantially uniform pressure across the one or more surfaces of the laminate assembly.

17. The method as recited in claim 16, wherein flexing of the one or more opposing platens comprises two or more platen extensions of one or more of the opposing platens pivoting relative to each other about a contour in the laminate assembly.

18. The method as recited in claim 15, further comprising pumping cold water through one or more linear fluid channels extending within and along the length of one or more of the opposing platens.

19. The method as recited in claim 15, wherein heating the opposing platens comprises radiating the opposing platens with one or more radiant heating elements.

20. The lamination press as recited in claim 1, wherein the platen comprises a plurality of joints that enable the plurality of platen extensions to pivot relative to each other.

21. The lamination press as recited in claim 20, wherein the plurality of joints comprise a tongue and groove configuration.

\* \* \* \* \*